United States Patent Office 3,407,168
Patented Oct. 22, 1968

3,407,168
ALKYLBENZENES AS DILUENTS FOR ELASTOMERIC OLEFIN POLYMERS
Pierluigi Calvi and Luigi Corbelli, Ferrara, Pier Livio Balzani, Forli, and Pierluigi Longhi, Milan, Italy, assignors to Monteshell Petrochimica S.p.A., Milan, Italy
No Drawing. Filed Mar. 30, 1966, Ser. No. 538,871
Claims priority, application Italy, Mar. 31, 1965, 7,060/65
30 Claims. (Cl. 260—33.6)

ABSTRACT OF THE DISCLOSURE

Amorphous vulcanizable copolymers of ethylene and propylene or butene-1 are extended by mixing the same with monoalkylbenzenes, polyalkylbenzenes, or mixtures thereof. The extenders comprise an aromatic nucleus having one or more linear or branched alkyl substituents containing from 1 to 20, preferably from 10 to 20, carbon atoms.

---

The present invention relates to vulcanizable compositions based on amorphous polymers of ethylene with an alpha-olefin containing as a plasticizer, extending or diluting agent, a mono- or poly-alkylbenzene, and to the vulcanized articles obtained therefrom. More particularly, it relates to the dilution with mono- or poly-alkylbenzenes of linear, amorphous, saturated copolymer of ethylene with propylene or butene-1, and to the vulcanized products thus obtained.

It is known that the aforementioned saturated copolymers having an elastomeric character, for their vulcanization require the addition of particularly reactive agents, such as organic peroxides, optionally accompanied by free-radical acceptors.

The technique of diluting the high molecular weight elastomers with paraffinic, naphthenic or aromatic lubricating oils is also known. The products thus obtained (oil-extended rubbers) show the most varied characteristics.

For the unsaturated elastomers, the vulcanization product is not influenced, or only influenced to a minor extent, by the addition of either small, or even relatively large, amount of mineral oils.

On the other hand, in the case of saturated elastomers, such as the elastomeric copolymers of ethylene with alpha-olefins, which require, as said above, due to their structure, particularly reactive cross-linking agents, it is necessary to use essentially paraffinic oils. In fact, peroxide vulcanization makes the use of naphthenic or aromatic oils, difficult, since they, by reacting with peroxide more easily than paraffinic oils due to the presence of more reactive positions in their structure, remarkably reduce the cross-linking power of the vulcanizing agents.

An object of the present invention is a vulcanizable composition based on saturated amorphous copolymers of ethylene with a higher alpha-olefin, such as propylene or butene-1, extended or plasticized with products which inter-react very little with the vulcanizing agents, remarkably less than the best paraffinic oils.

The ethylene-alpha-olefin copolymers preferably used according to the present invention are the ethylene-propylene or ethylene-butene-1 copolymers having a molar ethylene content from 20 to 80% and a molecular weight between 50,000 and 800,000, preferably between 60,000 and 500,000.

The dilution according to the present invention consists of adding to a copolymer as defined above, and having a viscosity ML (1+4) 100° C. (ASTM D–1646–61) not lower than 20, and a molar ethylene content between 20 and 80%, an alkyl benzene derivative in amount from 5 to 200 parts by weight per 100 parts of polymer, in the presence of vulcanization agents, reinforcing fillers, and of other ingredients commonly used in the vulcanization industry.

The present invention thus relates to a vulcanizable composition based on amorphous copolymers of ethylene with an alpha-olefin, containing a reinforcing filler, vulcanizing agents, an extending agent, possibly an antioxidant, characterized in that the extending agent is selected from the group consisting of monoalkylbenzenes, polyalkylbenzenes and mixtures thereof, consisting of an aromatic nucleus having one or more linear or branched alkyl substituents containing from 1 to 20 carbon atoms.

The alkylbenzenes can be easily obtained by Friedel-Crafts synthesis or by other common synthesis reactions.

The alkylbenzene dilution agents preferably have a viscosity varying from 2 to 100 centistokes at 100° C., a molecular weight comprised between 220 and 700 and should not contain moisture and various impurities; they must also have a good flow at low temperatures; a high flash point and boiling point, a low content of ashes and of total acidity.

For the alkylbenzenes according to the present invention, exemplary products are pure dodecylbenzene and the commercial product is Preadix 8. Preadix 8 is a mixture consisting of 50% of monoalkylbenzenes and 50% of polyalkylbenzenes in which the alkyl groups have a branched chain and contain about 15 carbon atoms.

Its appearance and physico-chemical characteristics are as follows:

| | |
|---|---|
| Appearance | Oily clear straw-yellow product. |
| Moisture and impurities | Absent. |
| Specific gravity at 15° C. | 0.88. |
| Engler viscosity at 50° C. | |
| Viscosity in centistokes at 100° C. | 5.6 7.1. |
| Flash point (Penski-Martins) | |
| Total a c i d i t y (neutralization number) | Above 160° C. 0.04%. |
| Asphalt and resins | Absent. |
| Active sulfur | Absent. |
| Corrosion test on copper | Negative. |
| Ash | Traces. |
| Boiling point | Above 300° C. |
| Index of refraction | $(n_D^{20})$:1.4899. |
| Aniline point | 69.5° C. |

Another alkylbenzene that gives particularly good results is a mixture of decyl-, undecyl-, dodecyl- and tridecyl-benzene.

By using such akylbenzene products, mixes with a high diluent content and having physical characteristics of the vulcanizates higher than those normally obtained by using the best paraffinic oils were obtained.

The technique of addition of these diluents can be that usually adopted for the plasticizers, by operating in an open or inner mixer. The diluents can be added during the polymerization or in the successive stages. The fillers, other ingredients and the vulcanization agents are then added to these mixtures of diluent and copolymer.

The reinforcing agent used can be of any type, more particularly of basic type, carbon black of any type, or a white mineral filler. The amount of reinforcing filler to be used is between 10 and 200%, preferably between 30 and 150% by weight, referred to the copolymer.

The vulcanization agents to be used are organic peroxides, in amount from 0.1 to 10 parts by weight per 100 parts of copolymer. Any organic peroxide can be used; the most commonly used are dibenzoyl peroxide, dicumyl peroxide, tert.butylperoxide, tert.butyl perbenzoate and α,α'-bis(tert.butylperoxy)diisopropylbenzene.

A free-radical acceptor in amount lower than the half by weight of the amount of peroxide may also be used. As free-radical acceptor, sulfur, quinonic compounds, furfural and its derivatives can be used.

The vulcanization is carried out by heating the mixes to temperatures between 110° and 220° C., preferably between 140° and 180° C.

The various commercial products used in the experiments are defined as follows:

TABLE I

| Trade Name | Description | Producer |
|---|---|---|
| Circosol 2XH | Naphthenic oil | Sun Oil Co. |
| Dutral N | Ethylene-propylene copolymer with a Mooney viscosity 35±5. | Monteshell Petrochimica S.p.A. |
| Dutral Q | Ethylene-propylene copolymer with a Mooney viscosity 45±5. | Do. |
| Dutral L | Ethylene-propylene copolymer with a Mooney viscosity above 50. | Do. |
| Dutrex 68 | Paraffinic oil | Shell Oil Co. |
| Fl-65 | do | Montecatini S.p.A. |
| Flectol H | Polymerized 1, 2-dihydro-2,4,4-trimethylquinoline. | Monsanto Chem. Co. |
| Flexon 765 | Paraffinic oil | Humble Oil & Refining Co. |
| Flexon 846 | do | Do. |
| Necton 60 | Paraffinic-naphthenic oil | Esso Standard Italiana. |
| Peroximon F.40 | α,α'-Bis(tert.butyl peroxy) diisopropylbenzene formulated at 40% with calcium carbonate. | Montecatini S.p.A. |
| Preadix 8 | Alkylbenzene diluent | I.C.I.R. S.p.A. Torino (Italy). |
| Prorex 39 | Paraffinic oil | Mobil Oil. |
| Sundex 1585 | Aromatic oil | Sun Oil Co. |
| Sun Process Aid 516 | Paraffinic oil | Do. |
| Sun Process Aid 551 | do | Do. |

The methods followed in the characterization tests of the vulcanizates were as follows:

| Characteristics | Breaking Unit | Reference |
|---|---|---|
| Tensile strength | kg./cm.$^2$ | ASTM-D-412. |
| Elongation at break | Percent | ASTM-D-412. |
| Modulus at 300% | kg./cm.$^2$ | ASTM-D-412. |
| IRHD hardness | | ASTM-D-1415. |
| Tear strength | kg./cm. | ASTM-D-624-54, B type. |
| Tensile permanent set | Percent | One hour under traction at 200% elongation at 20° C., reading after 1 minute. |
| Mooney viscosity | | ASTM-D-1646-61. |
| Garvey extrudability index | | B.S. Garvey et al. Ind. Eng. Chem. 34,1309 (1942). See Example 3 | diluent, carbon black and sulfur are prepared, while the peroxide is added in an open mixer.

The compositions of the mixes and the main mechanical characteristics are reported in Table 1.

In the mixes containing the paraffinic oil, the forming of the mix being the same, the interference of the oil with the vulcanizing action of the peroxide is evident. Preadix 8, on the other hand, interferes to a minimum extent, and makes it possible to obtain vulcanizates with remarkably better mechanical characteristics.

More precisely, by comparing the mechanical characteristics of the vulcanizates in Tests A, B, C and D, with those of Tests E, F, G and H, respectively, in addition to the better cross-linking degree shown by the higher values of modulus at 300% of the vulcanizates of mixes containing Preadix 8, also, lower values of permanent set, or a better elastic rebound as compared to the vulcanizates containing paraffinic oil, can be observed.

Furthermore, for example, from the comparison of Tests C and E with Tests D and F, it is observed that, at approximately equal values of elongation at break and of modulus, the vulcanizates of mixes E and F containing Preadix 8 require only 4 and 6 parts respectively of vulcanizing agent whereas 8 and 10 parts respectively are required by the vulcanizates of mixes C and D containing paraffinic oil.

TABLE 1.—EFFECT OF THE DILUENT PREADIX 8 ON THE PEROXIDIC VULCANIZATION OF ETHYLENE-PROPYLENE COPOLYMER

| Tests | A | B | C | D | E | F | G | H |
|---|---|---|---|---|---|---|---|---|
| Composition of the mixes: | | | | | | | | |
| Ethylene-propylene copolymer (50% by mols of ethylene and ML(1+4) 100° C.=80). | 75 | 75 | 75 | 75 | 75 | 75 | 75 | 75 |
| Oil FL-65 (paraffinic) | 25 | 25 | 25 | 25 | | | | |
| Diluent Preadix 8 | | | | | 25 | 25 | 25 | 25 |
| Carbon black HAF | 50 | 50 | 50 | 50 | 50 | 50 | 50 | 50 |
| Sulfur | 0.3 | 0.45 | 0.6 | 0.75 | 0.3 | 0.45 | 0.6 | 0.75 |
| Peroximon F-40 | 4 | 6 | 8 | 10 | 4 | 6 | 8 | 10 |
| Vulcanization conditions—40 minutes at 165° C. | | | | | | | | |
| Characteristics of the vulcanization: | | | | | | | | |
| Tensile strength, kg./cm.$^2$ | 173 | 178 | 166 | 144 | 160 | 158 | 152 | 142 |
| Elongation at break, percent | 590 | 495 | 390 | 340 | 385 | 335 | 275 | 240 |
| Modulus at 300%, kg./cm.$^2$ | 64 | 86 | 112 | 125 | 116 | 134 | 148 | 152 |
| Permanent set at 200%, percent | 8 | 5 | 4 | 3.5 | 4.5 | 4 | 3 | 2 |
| Tear strength, kg./cm | 53 | 33 | 24 | 24 | 37 | 26 | | 18 |
| IRHD hardness | 55 | 56.5 | 60 | 60.5 | 58.5 | 61 | 62 | 64 |

While the particular examples which follow are directed to comparison of alkylbenzene diluents with various paraffinic oils in regard to ethylene-propylene copolymers, results equally favorable to the use of alkylbenzene diluents can be obtained with regard to ethylene-butene-1 copolymers.

The following examples serve to better illustrate the invention without limiting its scope.

EXAMPLE 1

By operating in an inner mixer, the mixes of polymer,

EXAMPLE 2

By operating in an inner mixer, the mixes of polymer, diluent, carbon black, antioxidant and sulfur are prepared, while the peroxide is added in an open mixer.

The compositions of the mixes and the values of the main mechanical characteristics of the vulcanization are reported in Table 2.

These mixes also contain an antioxidant. It is known that most of the antioxidants used in the mixes of ethylene-propylene copolymers, such as Dutral, interfere with the peroxides during the vulcanization, thus causing a decrease of the main mechanical characteristics of the vulcanizate. Compare the mechanical characteristics of the vulcanizates of Table 2 with those of Table 1, in which the same basic modes of operation were followed. If this effect is combined with the adverse affect of the oils, a worsening in the properties of the vulcanizates is obtained.

The results of Table 2, however, show that with Preadix 8 in the mix, it is still possible to obtain remarkably better results than with the vulcanizates containing paraffinic oil. By comparing e.g., Tests D and F, it is observed that the modulus being about the same, the vulcanizate containing Preadix 8 requires only 6 parts of vulcanizing agent (peroximon F-40) against 10 parts consumed by the vulcanizate containing paraffinic oil. Moreover, from the comparison of Tests E and F of Table 2 with Tests B and C of Table 1, it also appears that, the modulus being about the same, the vulcanizates with Preadix 8, and protected by the antioxidant, Flectol H, require only 4 and 6 parts respectively of vulcanizing agent, instead of 6 and 8 parts respectively required by the vulcanizates containing paraffinic oil, and without antioxidant.

With the diluent Preadix 8, a remarkable economy in the use of peroxide is also obtained. For example, compare the higher modulus values in Tests E and F with the lower values in Tests A through D, in which as much and more peroxide was used than in Tests E and F.

The vulcanizates of ethylene-propylene copolymer, diluted with Preadix 8, as compared to the vulcanizates of mixes containing paraffinic oil Fl-65 (compare Tests A and B with E and F), with the same amount of cross-linking agent, show much better mechanical parameters. Compare, for instance, the higher tensile strength and modulus, and the lower elongation and permanent set. The values of these parameters are still satisfactorily compatible with the amounts of filler and diluent of the mixes. The vulcanizates containing paraffinic oil, on the other hand, are poor, and even with 9 parts of cross-linking agent, they do not reach the characteristics of the vulcanizates containing diluent Preadix 8 and only 5 parts of peroxide. Also, with the same cross-linking agent amount, the better elasticity (lower permanent set) of the vulcanizates containing Preadix 8 is further pointed out.

TABLE 2.—EFFECT OF THE DILUENT PREADIX 8 ON THE PEROXIDIC VULCANIZATION OF ETHYLENE-PROPYLENE COPOLYMER (DUTRAL) IN THE PRESENCE OF ANTIOXIDANTS

| Tests | A | B | C | D | E | F | G | H |
|---|---|---|---|---|---|---|---|---|
| Composition of the mixes: | | | | | | | | |
| Ethylene-propylene copolymer (50% by mols of ethylene and ML (1-4) 100° C.=10) | 75 | 75 | 75 | 75 | 75 | 75 | 75 | 75 |
| Oil FL-65 (paraffinic) | 25 | 25 | 25 | 25 | | | | |
| Oil Preadix 8 | | | | | 25 | 25 | 25 | 25 |
| Carbon black HAF | 50 | 50 | 50 | 50 | 50 | 50 | 50 | 50 |
| Antioxidant Flectol H | 0.5 | 0.5 | 0.5 | 0.5 | 0.5 | 0.5 | 0.5 | 0.5 |
| Zinc oxide | 5 | 5 | 5 | 5 | 5 | 5 | 5 | 5 |
| Sulfur | 0.3 | 0.45 | 0.6 | 0.75 | 0.3 | 0.45 | 0.6 | 0.75 |
| Peroximon F-40 | 4 | 6 | 8 | 10 | 4 | 6 | 8 | 10 |

Vulcanization conditions—40 minutes at 165° C.

| Characteristics of the vulcanizates: | | | | | | | | |
|---|---|---|---|---|---|---|---|---|
| Tensile strength, kg./cm.$^2$ | 162 | 157 | 157 | 146 | 172 | 164 | 160 | 150 |
| Elongation at break, percent | 645 | 525 | 440 | 360 | 505 | 400 | 325 | 290 |
| Modulus at 300%, kg./cm.$^2$ | 56 | 75 | 94 | 111 | 85 | 110 | 135 | 146 |
| Permanent set at 200%, percent | 10 | 8 | 7 | 7 | 8 | 6.5 | 5 | 3.5 |
| Tear strength, kg./cm | 51 | 44 | 27 | 28 | 40 | 28 | 23 | 20 |
| IRHD hardness | 56.5 | 58 | 61.5 | 62.5 | 53.5 | 61.5 | 63 | 64.5 |

EXAMPLE 3

By operating in an inert mixer, the mixes of polymer, diluent, carbon black and sulfur are prepared, while the peroxide is added in an open mixer. The compositions of the mixes and the values of the main mechanical characteristics of the vulcanizates are reported in Table 3.

These tests emphasize the surprising specific adaptability of the diluent Preadix 8 in the mixes based on ethylene-propylene copolymer suitable for moulded articles, and more particularly, for extruded articles with low hardness, lower than 50 points.

In the current art, the Garvey die makes it possible to extrude through a trapezoidal section, an extruded article which is evaluated on the basis of its section, top, surface and corners. To each parameter a score, from 1 to 4, 4 being very good, is given. The extrudability index is the sum of the four values given to each parameter. The maximum value is 16.

In the case of extruded articles, very good values of the Garvey's extrudability index of the mixes can be observed with Preadix 8, as compared to those with paraffinic oil. Compare Tests A and B with E and F.

TABLE 3

[The effect of the diluent Preadix 8 in mixes of ethylene-propylene copolymer (Dutral) suitable for low-hardness moulded or extruded articles]

| Tests | A | B | C | D | E | F |
|---|---|---|---|---|---|---|
| Composition of the mixes: | | | | | | |
| Ethylene-propylene copolymer (50% by mols of ethylene and ML (1+4) 100° C.=35) | 100 | 100 | 100 | 100 | 100 | 100 |
| Oil FL-65 (paraffinic) | 50 | 50 | 50 | 50 | | |
| Diluent Preadix 8 | | | | | 50 | 50 |
| FEF carbon black | 60 | 70 | 70 | 70 | 60 | 70 |
| Sulfur | 0.35 | 0.35 | 0.5 | 0.7 | 0.35 | 0.35 |
| Peroximon F-40 | 5 | 5 | 7 | 9 | 5 | 5 |

Vulcanization conditions—40 minutes at 165° C.

| Characteristics of the vulcanizates: | | | | | | |
|---|---|---|---|---|---|---|
| Tensile strength, kg./cm.$^2$ | 62 | 67 | 85 | 91 | 92 | 99 |
| Elongation at break, percent | 955 | 865 | 770 | 700 | 560 | 570 |
| Modulus at 300%, kg./cm.$^2$ | 16 | 20 | 31 | 37 | 43 | 46 |
| Permanent set at 200%, percent | 21 | 20 | 12 | 10 | 8 | 7 |
| Tear strength, kg./cm | 33 | 41 | 42 | 40 | 28 | 37 |
| IRHD hardness | 32 | 36.5 | 40 | 44 | 36 | 39 |
| Garvey extrudability index of the crude mix | 14.5 | 14 | 14 | 14 | 16 | 16 |

EXAMPLE 4

By operating in an inner mixer, the mixes of polymer, diluent, carbon black and sulfur are prepared, while the peroxide is added in an open mixer. The compositions of the mixes and the values of the main mechanical characteristics of the vulcanizates are reported in Table 4.

These tests confirm the better behavior of Preadix 8, as compared to the paraffinic oil used for comparison; It is seen that it is possible to obtain vulcanizates for low-hardness, moulded or extruded articles, containing large amounts of diluent and carbon black, and having good mechanical properties.

TABLE 4

[Effect of the diluent Preadix 8 in the mixes of ethylene-propylene copolymer (Dutral) suitable for economical low-hardness moulded or extruded articles.]

| Tests | A | B | C | D |
|---|---|---|---|---|
| Composition of the mixes: | | | | |
| Ethylene-propylene copolymer (50% by mols of ethylene and ML (1+4) 100° C.=45). | 100 | 100 | 100 | 100 |
| Oil FL-65 | 100 | 100 | | |
| Diluent Preadix 8 | | | 100 | 100 |
| FEF carbon black | 150 | 100 | 150 | 100 |
| SRF carbon black | | 90 | | 90 |
| Sulfur | 0.75 | 0.75 | 0.75 | 0.75 |
| Peroximon F-40 | 10 | 10 | 10 | 10 |
| Mooney viscosity of the mix | 18.5 | 20 | 22.5 | 22 |
| Vulcanization conditions—40 minutes at 165° C. | | | | |
| Characteristics of the vulcanizates: | | | | |
| Tensile strength, kg./cm.$^2$ | 44 | 34 | 69 | 71 |
| Elongation at break, percent | 620 | 500 | 330 | 280 |
| Modulus at 300%, kg./cm.$^2$ | 23 | 23 | 64 | 68 |
| Permanent set at 200%, percent | 12 | 10 | 11 | 9 |
| Tear strength, kg./cm | 29 | 23 | 28 | 25 |
| IRHD hardness | 38 | 41.5 | 52.5 | 54 |

EXAMPLE 5

By operating in an open mixer, thet mixes are prepared whose compositions are reported in Table 5. In Table 5 are also reported the values of the main mechanical characteristics of the vulcanizates. They show that it is possible to obtain vulcanizates having good mechanical properties by using various types of alkylbenzenes. Besides Preadix 8, pure dodecyl benzene, and a mixture of decyl-undecyl-dodecyl-tridecylbenzenes (called mix AB), prepared in a laboratory by Friedel-Crafts synthesis, are exemplified. The mixture AB was found to have a specific gravity of 0.855 at 15° C., an index of refraction ($n_D^{20}$) of 1.482 and a boiling point of 297–341° C.

TABLE 5

[Effect of various alkylbenzenes on the peroxidic vulcanization of ethylene-propylene copolymer (Dutral)]

| Tests | A | B | C | D |
|---|---|---|---|---|
| Composition of the mixes: | | | | |
| Ethylene-propylene copolymer (see Example 1). | 75 | 75 | 75 | 75 |
| Oil F1-65 (paraffinic) | 25 | | | |
| Diluent Preadix 8 | | 25 | | |
| Pure dodecyl benzene | | | 25 | |
| Mixture AB | | | | 25 |
| HAF carbon black | 50 | 50 | 50 | 50 |
| Sulfur | 0.45 | 0.45 | 0.45 | 0.45 |
| Peroximon F-40 | 6 | 6 | 6 | 6 |
| Vulcanization conditions—40 minutes at 160° C. | | | | |
| Characteristics of the vulcanizates: | | | | |
| Tensile strength, kg./cm.$^2$ | 174 | 166 | 160 | 153 |
| Elongation at break, percent | 405 | 320 | 420 | 320 |
| Modulus at 300%, kg./cm.$^2$ | 99 | 153 | 112 | 141 |
| Permanent set at 200%, percent | 6 | 5 | 6 | 4 |
| IRHD hardness | 54 | 58 | 57 | 64 |

EXAMPLE 6

By operating in an open mixer the mixes whose compositions are reported in Table 6 are prepared. In Table 6, it is shown that with the diluent Preadix 8 it is possible to obtain very good mechanical properties of the vulcanizates in comparison with various commercial paraffinic oils. Note, for instance, the high modulus and low permanent set obtained with Preadix 8.

TABLE 6.—EFFECT OF THE DILUENT PREADIX 8 ON THE VULCANIZATION OF ETHYLENE-PROPYLENE COPOLYMER IN COMPARISON WITH COMMERCIAL PARAFFINIC OILS

| Tests | A | B | C | D | E | F | G | H | I |
|---|---|---|---|---|---|---|---|---|---|
| Composition of the mixes: | | | | | | | | | |
| Ethylene-propylene copolymer (50% by mols of ethylene and ML (1+4) 100° C.=10). | 75 | 75 | 75 | 75 | 75 | 75 | 75 | 75 | 75 |
| Diluent Preadix 8 | 25 | | | | | | | | |
| Oil FL-65 | | 25 | | | | | | | |
| Oil Sun Process aid 551 | | | 25 | | | | | | |
| Oil Prorex 39 | | | | 25 | | | | | |
| Oil Flexon 846 | | | | | 25 | | | | |
| Oil Dutrex 68 | | | | | | 25 | | | |
| Oil Sun Process aid 516 | | | | | | | 25 | | |
| Oil Flexon 765 | | | | | | | | 25 | |
| Oil Necton 60 | | | | | | | | | 25 |
| Carbon black HAF | 50 | 50 | 50 | 50 | 50 | 50 | 50 | 50 | 50 |
| Sulfur | 0.3 | 0.3 | 0.3 | 0.3 | 0.3 | 0.3 | 0.3 | 0.3 | 0.3 |
| Peroximon F-40 | 4 | 4 | 4 | 4 | 4 | 4 | 4 | 4 | 4 |
| Vulcanization conditions—40 minutes at 165° C. | | | | | | | | | |
| Characteristics of the vulcanizates: | | | | | | | | | |
| Tensile strength, kg./cm.$^2$ | 160 | 173 | 165 | 167 | 158 | 169 | 165 | 168 | 156 |
| Elongation at break, percent | 385 | 590 | 580 | 580 | 600 | 585 | 605 | 600 | 620 |
| Modulus at 300%, kg./cm.$^2$ | 116 | 64 | 68 | 69 | 59 | 67 | 60 | 63 | 59 |
| Permanent set at 200%, percent | 4.5 | 8 | 8 | 8 | 8.5 | 8 | 8.5 | 8 | 9 |
| IRHD hardness | 58.5 | 55 | 57 | 54 | 54 | 56 | 55.5 | 56 | 57 |

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. A vulcanizable composition of saturated, amorphous copolymers of ethylene with a higher alpha-olefin selected from the group consisting of propylene and butene-1, and an extending agent selected from the group consisting of monoalkylbenzenes, polyalkylbenzenes and mixtures thereof, said benzenes having an aromatic nucleus with at least one alkyl substituent containing from 10 to 20 carbon atoms.

2. A composition according to claim 1, in which the alkyl substituent is linear.

3. A composition according to claim 1, in which the alkyl substituent is branched.

4. A composition according to claim 1, in which the alkylbenzene extending agent has a viscosity of from 2 to 100 centistokes at 100° C., a molecular weight between about 420 and 700, is free from moisture and impurities, has a high flash point and boiling point, a low content of ash, a low total acidity, and has good flow at low temperatures.

5. A composition according to claim 1, in which the alkylbenzene extending agent is a mixture of alkylbenzenes, in which the alkyl substituent of the various members of the mixture varies from 10 to 20 carbon atoms.

6. A composition according to claim 1, in which the alykylbenzene compound is pure dodecyl benzene.

7. A composition according to claim 1, in which the extending agent is a mixture of about 50% of monoalkylbenzenes and about 50% of polyalkylbenzenes in which the alkyl groups have a branched chain and contain about 15 carbon atoms.

8. A composition according to claim 1, in which the extending agent is used in amount from 5 to 200 parts by weight per 100 parts of polymer.

9. A composition according to claim 1, in which the higher alpha-olefin is propylene.

10. A composition according to claim 1, in which the higher alpha-olefin is butene-1.

11. A composition according to claim 1, in which the ethylene content is from 20 to 80%.

12. A composition according to claim 1, in which the copolymer has a molecular weight of from 50,000 to 800,000.

13. A composition according to claim 12, in which the copolymer has a molecular weight of from 60,000 to 500,000.

14. A composition according to claim 9, in which the viscosity of the polymer, as determined according to ASTM D-1646-61, is at least 20.

15. A composition according to claim 1, which also contains a reinforcing filler and a vulcanization agent.

16. A composition according to claim 15, which also contains an antioxidant.

17. A composition according to claim 15, in which an organic peroxide in amount from 0.1 to 10 parts by weight per 100 parts of copolymer is used as vulcanizing agent.

18. A composition according to claim 17, in which a free-radical acceptor in amount lower than half by weight of the peroxide amount is used.

19. A composition according to claim 18, in which the free-radical acceptor is selected from the group consisting of sulfur, quinonic compounds, furfural and its derivatives.

20. A composition according to claim 15, in which the reinforcing filler is carbon black.

21. A composition according to claim 15, in which the reinforcing filler is used in an amount between 10 and 200% by weight of the copolymer.

22. A process for preparing vulcanizates having high mechanical properties comprising preparing a vulcanizable composition containing a saturated amorphous copolymer of ethylene and a higher alpha-olefin selected from the group consisting of propylene and butene-1, a reinforcing filler, a vulcanizing agent and an extending agent for the copolymer selected from the group consisting of monoalkylbenzenes, polyalkylbenzenes and mixtures thereof, said benzenes having an aromatic nucleus and at least one alkyl substituent containing 10 to 20 carbon atoms, and then vulcanizing this mixture at a temperature between 110° and 220° C.

23. A process according to claim 22, in which the temperature is between 140 and 180° C.

24. A process according to claim 22, in which said composition contains 5 to 200 parts by weight of extending agent per 100 parts of polymer.

25. A process according to claim 22, in which the higher alpha-olefin is propylene.

26. The process according to claim 22, in which the higher alpha-olefin is butene-1.

27. A process according to claim 22, in which the vulcanizable composition also contains an antioxidant.

28. A process according to claim 22, for preparing low hardness articles, in which, in the vulcanizable composition, an amount of extending agent of at least 1 part for every 2 parts by weight of polymer is used, and in which an amount of filler of at least 6 parts for every 10 parts by weight of polymer is used.

29. A process according to claim 22, in which economical, low hardness articles are produced in which the amount of extending agent used is at least one part per part by weight of polymer, and in which the amount of filler is at least one part of filler per part by weight of polymer.

30. Vulcanized elastomers obtained according to the process of claim 22.

References Cited

UNITED STATES PATENTS 2,885,378   5/1959   Darby.
3,296,184   1/1967   Portolani et al. _____ 260—41

MORRIS LIEBMAN, *Primary Examiner.*

S. L. FOX, *Assistant Examiner.*